United States Patent [19]

Stoner

[11] 3,979,032
[45] Sept. 7, 1976

[54] METAL MELTING AND CASTING APPARATUS

[75] Inventor: Jesse A. Stoner, DeKalb, Ill.

[73] Assignee: General Electric Company, Fort Wayne, Ind.

[22] Filed: July 22, 1974

[21] Appl. No.: 490,257

Related U.S. Application Data

[62] Division of Ser. No. 397,425, Sept. 14, 1973.

[52] U.S. Cl. .................................. 222/593; 13/27; 164/335; 222/604
[51] Int. Cl.² ................. B22D 39/00; B22D 41/04; B22D 41/06
[58] Field of Search ................. 266/13, 33 R, 33 S; 164/312, 335, 80, 254; 13/1, 10, 26, 27; 219/10.67, 10.69, 10.73; 222/146 HE, 166, 593, 604; 214/18 SC; 221/289

[56] References Cited
UNITED STATES PATENTS

| 1,080,807 | 12/1913 | Benjamin | 13/1 |
| 2,294,170 | 8/1942 | Francis et al. | 164/80 |
| 2,509,670 | 5/1950 | Capita et al. | 13/27 X |
| 3,601,179 | 8/1971 | Taylor | 164/254 |
| 3,612,740 | 10/1971 | Gierek et al. | 13/9 |

Primary Examiner—Robert B. Reeves
Assistant Examiner—David A. Scherbel
Attorney, Agent, or Firm—Joseph E. Papin

[57] ABSTRACT

Melting and casting apparatus wherein a metal pellet is transferred from a receptacle into a casting ladle. Thereafter, the casting ladle is moved into a RF heater where the pellet is melted. The casting ladle containing the molten metal is then moved by a suttle and guide arrangement to a pouring position where the casting ladle is tipped by a linkage assemble to pour the metal.

38 Claims, 6 Drawing Figures

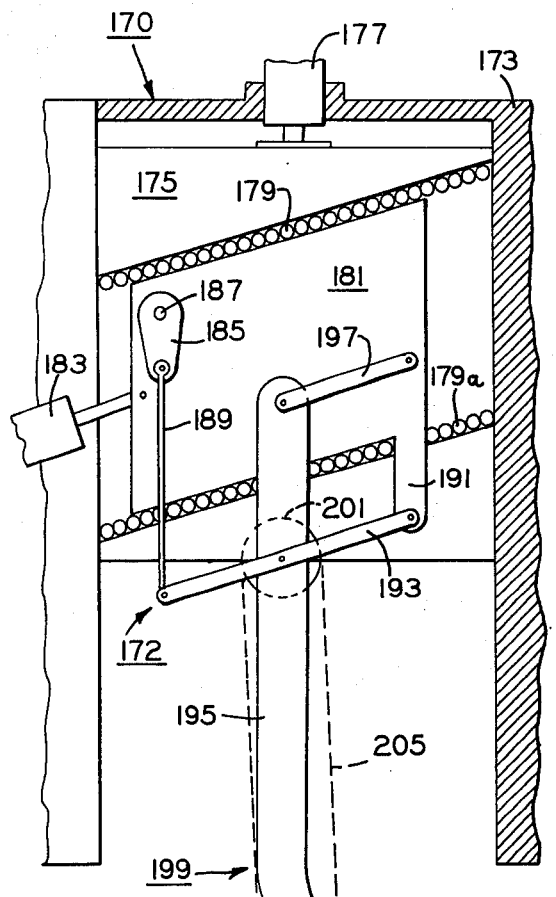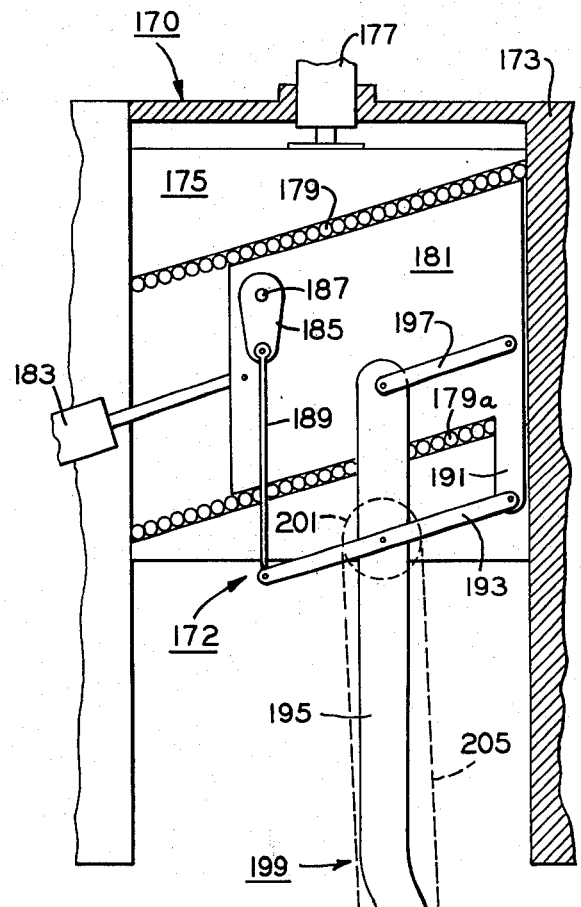
FIG. 1
FIG. 2

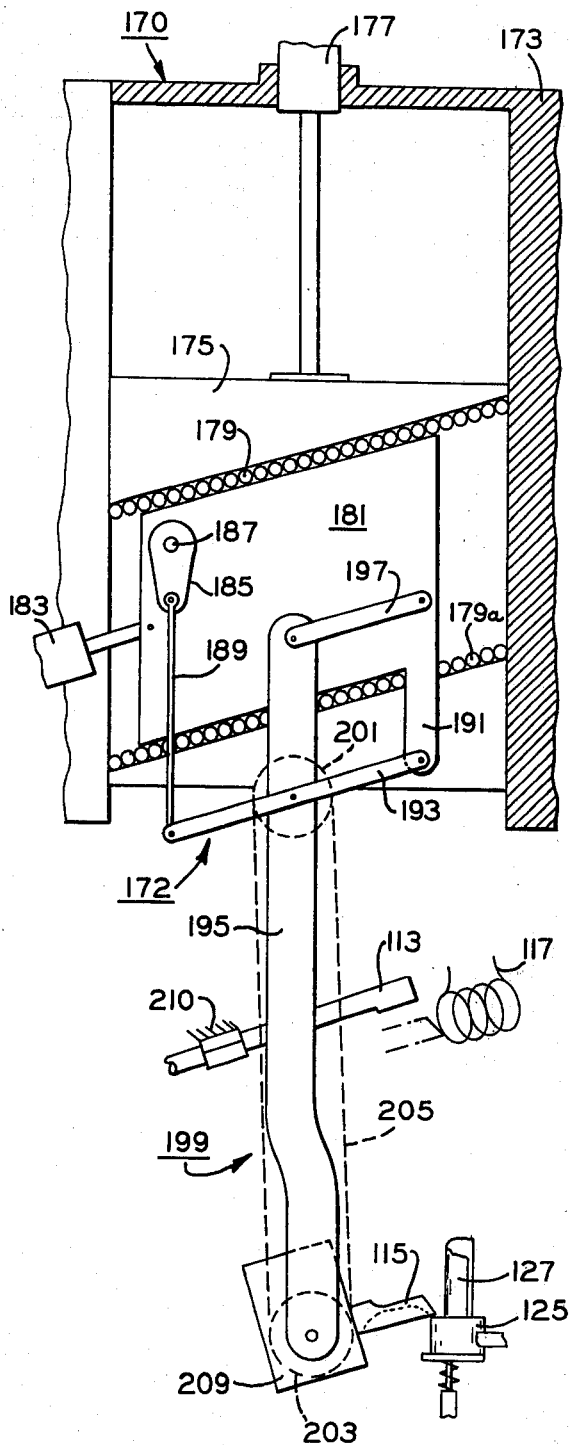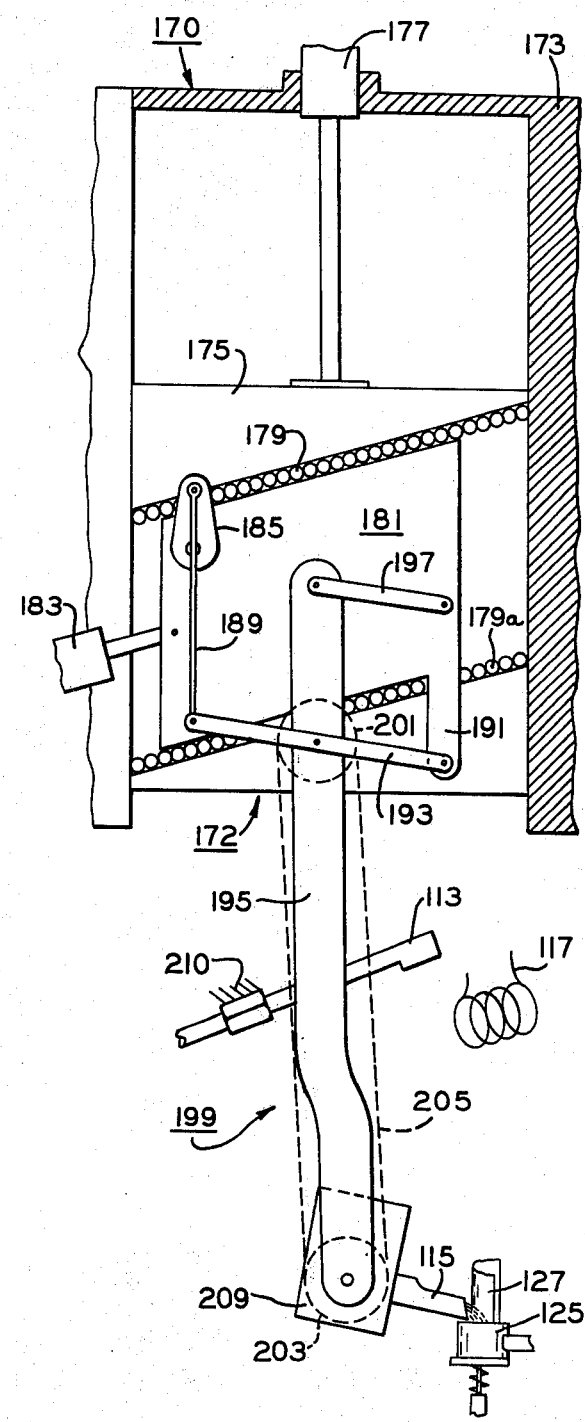
FIG. 3
FIG. 4

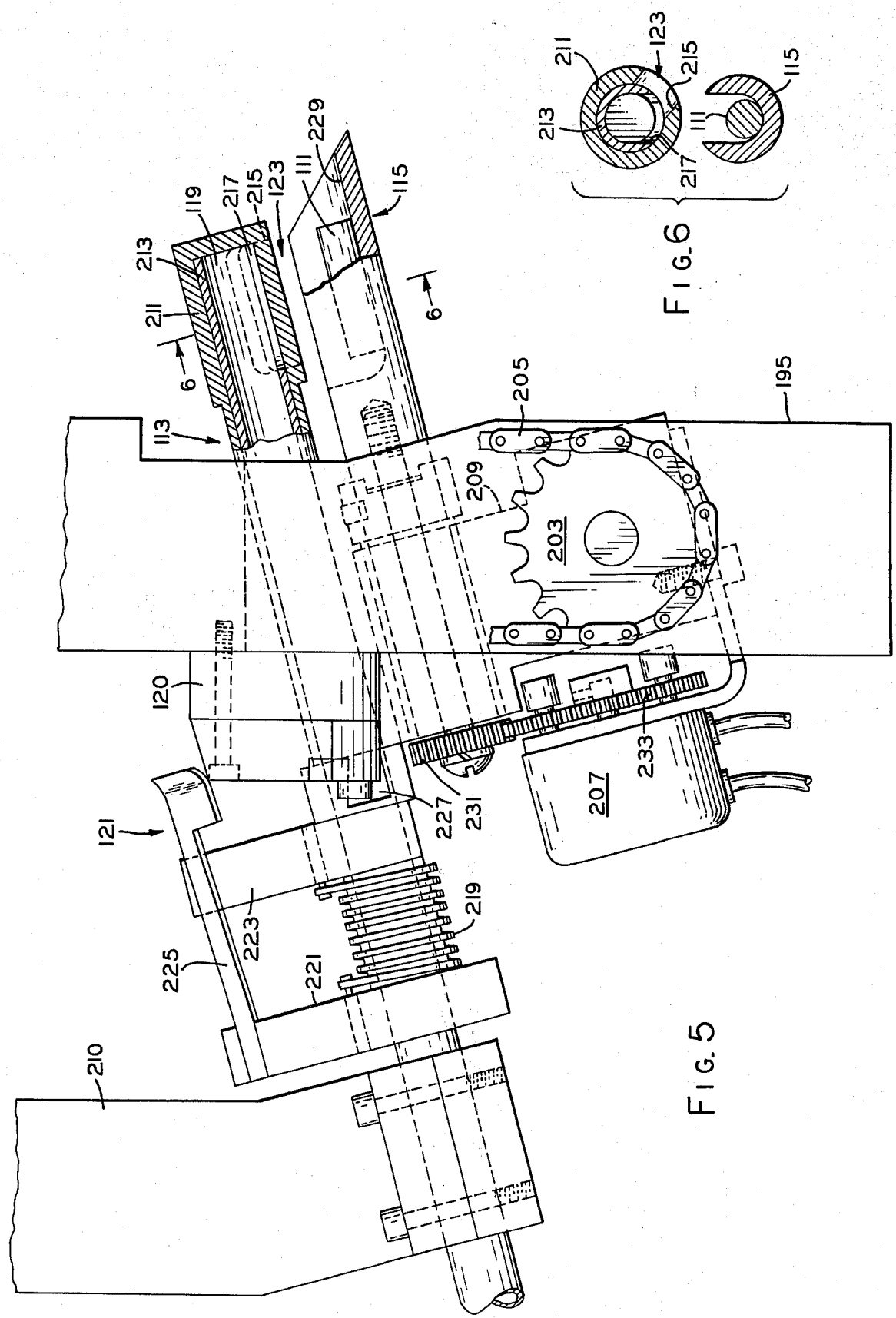

METAL MELTING AND CASTING APPARATUS

RELATED APPLICATIONS

This application for patent is a division of copending application Ser. No. 397,425 filed Sept. 14, 1973 which is specifically incorporated herein by reference.

FIELD OF THE INVENTION

The present invention relates generally to apparatus for casting a metal and in particular to such apparatus as may be employed to attach an end frame and another structural component of a dynamoelectric machine.

BACKGROUND OF THE INVENTION

In the manufacture of a dynamoelectric machine, it is necessary that a rotatable assembly thereof, such as a shaft and rotor for instance, be properly aligned both radially and axially with a cooperating stator or stationary assembly of the dynamoelectric machine. If radially misaligned, an eccentric air gap between the rotatable assembly and stator may result thereby to effect a non-uniform flux path with poor electric efficiencies and the mechanical deficiency of vibration, and if axially misaligned, an undesirably great amount of axial rotor thrust is produced. Of course, it is also necessry that bearing means carried by an end frame construction of the dynamoelectric machine be aligned and in suitable journaling engagement with the rotatable assembly in order to provide proper longevity for such bearing means.

In the past, several different methods of assemblying dynamoelectric machines have been utilized to effect the abovementioned proper radial and axial alignment of the rotatable assembly, stator and end frames of the dynamoelectric machine. For example, through-bolts have been used to interconnect the stator and end frames of a dynamoelectric machine with the rotatable assembly thereof journaled in the end frames; however, one of the disadvantageous or undesirable features of this construction is believed to be that rather close tolerances were required to attain proper alignment of the dynamoelectric machine components, and maintaining close tolerances manifestly results in increased machining and assembly costs of manufacture. Another past method of assembling dynamoelectric machines was to employ an oversized dummy rotatable assembly to effect the necessary alignment between the stator and end plate and thereafter substitute an actual rotatable assembly for the dummy rotatable assembly; however, one of the disadvantageous or undesirable features of this method of construction is believed to be that it was limited to "unit bearing" type machines wherein the rotatable assembly is supported in only one end frame. As a result, this method was unavailable for use in the greater majority of dynamoelectric machines wherein the rotatable assembly is supported in oppositely disposed end frames.

In U.S. Pat. No. 3,165,816 shims were disposed between the rotatable assembly and stator to effect proper radial alignment therebetween, and a rocker arm mechanism was employed to maintain the rotatable assembly and stator in their proper assembled positions while an adhesive such as a thermosetting resin, was applied to bond together the stator and opposite end plates in which the rotatable assembly was journaled.

In U.S. Pat. No. 3,705,994 another method of assembling dynamoelectric machines is disclosed wherein the opposite end frames thereof were welded to beams carried by the stator while the rotatable assembly was supported therein; however, one of the disadvantageous or undesirable features of this method is believed to be that the welds themselves, upon cooling, created stresses which tend to effect misalignment, as well known to the art.

In U.S. Pat. No. 2,892,225, there is disclosed a method of casting metal wherein molten metal in predetermined amounts are delivered directly from a source or furnace therefor to a casting ladle disposed adjacent to a mold, and the molten metal is then poured from the ladel into the mold. One of the disadvantageous or undesirable features of this past method of casting metal is believed to be that it was necessary not only to maintain the molten metal in the furnace at a predetermined temperature proper for the casting operations but it was also necessary to maintain such predetermined temperature of the molten metal as it was delivered from the source to the casting ladle. Since some metals, such as zinc, lead, aluminum or the like and various alloys thereof cool or solidify at a rather rapid rate, the time factor involved in delivering such molten metal from the source thereof to the casting ladle and casting it may, of course, be critical and relatively short.

The principle object of the present invention is to provide a method for casting a metal which overcome the aforementioned disadvantageous or undesirable features of the past apparatus, and this, as well as other objects and advantageous features of the present invention, will be in part apparent and in part pointed out in the specification which follows.

SUMMARY OF THE INVENTION

Also in general and in one form of the invention, apparatus for casting metal is provided with means for casting metal melted therein. Means is also provided for receiving a predetermined amount of metal in its solid state including means for depositing the entire amount thereof into the casting means, and means for moving the casting means to a metal casting position when the metal therein is melted.

Further in general, apparatus in one form of the invention has a housing, and a pair of means are adapted to be relatively and conjointly movable in the housing. Means is provided for receiving metal in its solid state therein, and means is also provided for linking the receiving means with one of the movable means. Means is provided for melting metal, and the movable means are operable generally to initially move the receiving means toward a position juxtaposed with the melting means to melt the metal in the receiving means and thereafter to further move the receiving means toward a position for casting. The linking means includes means for tilting the receiving means to pour the molten metal therefrom when the receiving means is in its casting position.

BRIEF DESCRIPTION OF THE DRAWINGS

FIGS. 1, 2, 3 and 4 are schematic views illustrating apparatus in one form of the invention for casting a metal in one form of the invention;

FIG. 5 is a side elevation, partially in cross-section of metal receiving, transferring and casting means of the apparatus of FIGS. 1–4; and FIG. 6 is a sectional view taken along line 6--6 of FIG. 5.

Corresponding reference characters indicate corresponding parts throughout the several views of the drawings.

The following exemplifications set out herein illustrate the preferred embodiment of the invention in one form thereof, and such exemplifications are not to be construed as limiting in any manner the scope of the invention.

DETAILED DESCRIPTION OF THE PREFERRED EMBODIMENTS

Referring now to the drawings in general, a method in one form of the invention for casting a metal is illustrated. In this method, a metal in its solid state, such as a disc or cylindric pellet or slug 111 of zinc, lead, aluminum or the like or various alloys thereof, is supplied to a receptacle, such as a receiving means or transfer mechanism 113 (FIG. 5). Metal pellet 111 is then transferred in its solid state from receptacle 113 into means, such as a casting ladle 115, for casting the metal. Thereafter, metal pellet 111 is melted in casting means 115 by suitable means well known in the art, such as an RF heater 117 or other heater or the like (FIG. 2), and the casting means is moved to a metal casting position (FIG. 3 and 4).

More particularly and with refrence to FIG. 1, pellet 111 of a predetermined volume or amount of metal is supplied from a source thereof (not shown) into a chamber 119 of receptacle 113. Upon upward movement of ladle 115 toward receptacle 113, a wiping block or abutment 120 wipes or engages a trigger mechanism 121 to cock or actuate it thereby to open means, such as an opening or passage 123 in the receptacle 113, for transferring or the passage of the metal pellet from chamber 119 into the ladle. With pellet 111 transferred in its solid state from chamber 119 of receptacle 113 to ladle 115, the ladle is moved so as to enter RF heater 117, as shown in FIG. 2, and the metal is thereby melted being transformed to its liquid or molten stage for subsequent casting. Ladle 115 is then removed from RF heater 117 and further moved downwardly to a casting position juxtaposed with means, such as a socket 125 or the like in an end frame or other structural member of a dynamoelectric machine for instance, for containing or receiving molten metal 111 from ladle 115, as shown in FIG. 3. In its casting position, ladle 115 is then tipped or pivotally moved about an axis thereof, as shown in FIG. 4, casting or pouring molten metal 111 into socket 125 for solidification thereby to establish a connection between at least a part of the socket and another structural component, such as a beam 127 or the like of a dynamoelectric machine, which is disposed in assembled position within the socket.

Referring now in general to the drawings, there is shown apparatus 170 having means, such as ladle 115, for casting metal melted therein (FIG. 1). Means for transferring or dispensing the metal to ladle 115 is generally constituted by means, such as receptacle 113, for receiving a predetermined amount of metal in a solid state, means, such as opening 123, for the passage of the entire amount of the metal into casting means or ladle 115, and means, such as a tube 211 or the like discussed hereinafter, associated with the receptacle and operable generally for depositing the metal through the opening into the ladle (FIG. 5). Means, such as a linkage assembly indicated generally at 172, is provided for moving the casting means to a metal casting position when the metal therein is melted. (FIGS. 3 and 4)

More particularly, a housing 173 is provided in which a movable means, such as a block or guide 175, is adapted to be reciprocably movable generally vertically by suitable means, such as a double-acting air cylinder 177 or the like, for actuating guide 175, as shown in FIGS. 1–4. Conveyor means, such as parallel runs or races or rollers or bearings 179, 179a are provided in guide 175 extending therethrough at a predetermined angle, and another movable means such as a shuttle or block 181, is reciprocably movable generally horizontally with respect to the guide on rollers 179, 179a by suitable means, such as another double-acting air cylinder 183 or the like, for actuating the shuttle.

Linkage assembly or linking means 172 comprises a crank 185 which has one end rotatably connected at 187 to shuttle 181 while a side linkage or arm 189 is pivotably connected with the other end of the crank, and another side linkage or arm 191, which is generally parallel to link 189, extends integrally from the lower end of shuttle 181. A cross-link 193 is pivotally interconnected between the distal ends of side links 189, 191, and a support arm 195 for receptacle 113 and ladle 115 is pivotally mounted on the cross-link adjacent the mid-portion thereof. A connecting link 197 is pivotally connected between the upper end of support arm 195 and the mid-portion of side link 191 being generally parallel with cross-link 193. A sprocket and chain drive means, indicated generally at 199, for driving ladle 115 is provided with upper and lower sprockets 201, 203 rotatably mounted on support arm 195, and a drive chain 205 is connected or run about the sprockets, the upper sprocket being drivenly connected with cross-link 193 and rotatable therewith about support arm 195.

Referring now also to FIGS. 5 and 6, ladle 115 and a rotary solenoid 207 for effecting inversion thereof, as discussed hereinafter, are carried on a support or mounting means 209 which is interconnected by suitable means (not shown) for pivotal movement with lower sprocket 203, i.e. for conjoint rotation therewith.

Another tube 213, which is generally constituted by receptacle 113, is mounted on a stationary member or part 210 and generally concentric with tube 211, and metal pellet 111 is supplied through tube 213 for entry into pellet chamber 119 therein. A pair of slots 215, 217 are respectively provided in tubes 211, 213 and are, in the at-rest position of the tubes, angularly displaced from each other thereby to close pellet chamber 119 preventing the transfer or passage of any pellet 111 therefrom, the slots 215, 217 generally constituting opening 123. Trigger mechanism 121 is provided with a torsion spring 219 engaged between a pair of stationary and rotatable posts 221, 223, and a resilient locking member or trip 225 is disposed on the stationary post in locking or displacement preventing engagement with the rotary post. Outer concentric tube 211 is drivingly connected for conjoint rotation with rotatable post 223 upon wiping engagement of trip 225 with support arm abutment 195, and a cocking lever 227 is integrally formed with the rotatable post for engagement with the support arm abutment upon downward movement thereof to return or re-rotate the rotatable post to its original position in locking engagement with the trip after pellet 111 has been delivered to the ladle, as discussed hereinafter.

Ladle 115 is rotatably supported in its mounting means 209, and a recess portion or spout 229, into which pellet 111 is deposited, is provided in the rightward end of the ladle. To complete the description of casting apparatus 170, a gear 231 is drivingly connected to ladle 115 on its leftward end for effecting rotation thereof to empty any residue of metal which may remain in spout 229 subsequent to the casting operation, as discussed hereinafter, and another gear 233 carried by rotary solenoid 207 is drivingly meshed with ladle gear 231.

In the operation, assume that guide 175 is moved upwardly by its actuator 177, as shown in FIG. 1, so that ladle 115 is conjointly moved upwardly therewith into juxtaposition with receptacle 113. Upon such conjoint upward movement, wiping block 120 engages and moves trip 225 to a position displaced from rotatable post 223 permitting the force of torsion spring 219 to effect concerted rotation of the rotatable post and outer concentric tube 211, FIG. 5. Upon rotation of tube 211, slot 215 therein is brought into registry with slot 217 of inner-concentric tube 213 thereby to establish or open opening 123, and metal pellet 111 which had been supplied into chamber 119 is transferred by gravity therefrom dropping or passing through the opening into spout 229 of ladle 115, FIG. 6. As shown in FIG. 2, shuttle actuator 183 thereafter moves shuttle 181 rightwardly on roller runs 179, 179a to an end position, and ladle 115 is conjointly movable with the shuttle toward a position entered into RF heater 117 thereby to heat metal pellet 111 in ladle spout 229 for changing the state thereof from solid to molten. After the change of state of metal pellet 111 occurs, shuttle actuator 183 retracts or removes shuttle 181 to the position shown in FIG. 1, and guide actuator 177 thereafter moves guides 175 downwardly in housing 173 to the position shown in FIG. 3 wherein ladle 115 with molten metal 111 therein is juxtaposed with socket 125. As shown in FIG. 4, crank 185 is turned by suitable means (not shown) approximately 180° to actuate linkage assembly 172 which raises support arm 195 causing conjoint upward movement of ladle 115 therewith relative to socket 125; however, the actuation of linkage assembly 172 to raise support arm 195 also effects rotation of upper sprocket 201 to drive chain 205 and conjointly rotate lower sprocket 203. Since ladle mount 209 is rotatably driven by lower sprocket 203, ladle 115 is tipped or pivoted in its casting position whereby molten metal 111 is poured or cast from ladle spout 229 into socket 125 for solidification therein to establish a rigid connection between the socket and beam 127 therein. It may be noted that since beam 127 is generally U-shaped in cross-section, a passage is thereby provided through which at least a portion of the molten metal is poured during the casting operation, as described above, and ladle 115 is moved into juxtaposition relative to the beam and socket to effect the pouring of the molten metal through the beam passage into the socket.

After the casting operation, crank 185 is returned to its original position which drives linkage assembly 172 to its original position, and upon the return of the linkage assembly to its original position, sprocket and chain drive 199 is reversely driven thereby to its original position which effects the pivoting of ladle mount 209 to its original position. At the same time, guide actuator 177 moves guide 175 upwardly in housing 173 to its original position wherein apparatus 170 is disposed as shown in FIG. 1. To complete the description of the operation, rotary solenoid 207 is energized driving meshed gears 233, 231 to effect rotation of ladle 115 in its amount 209 to an inverted position for emptying any metal residue from ladle spout 229 which may remain therein after the casting operation, and in this manner, the ladle is cleansed in preparation of receiving another metal pellet or slug 111 during the next cycle of casting apparatus 170.

Although only one apparatus 170 has been described hereinabove along with its casting operation, it is apparent that a plurality of such apparatus can be employed for simultaneously casting in place other beams 127 within other sockets 128 of the end frame.

In view of the foregoing, it is now apparent that a novel apparatus for casting metal is provided by way of illustration meeting all of the objects and advantageous features set forth hereinabove, as well as others noted in the specification, and that changes in the particular arrangements, shapes and details of components embraced by such novel apparatus may be made by those skilled in the art without departing from the spirit of the invention and the scope thereof, as set out in the claims which follow.

What I claim as new and desire to secure by Letters Patent of the United States is:

1. Apparatus for casting a metal comprising means for casting the metal melted therein, means for dispensing the metal to said casting means including means for receiving a predetermined amount of the metal in its solid state, means for the passage of the metal from said receiving means, and means associated with said receiving means and operable generally for depositing the metal through said passage means into said casting means, and means for moving said casting means to a metal casting position when the metal therein is melted.

2. Apparatus as set forth in claim 1 further comprising means for melting the metal in said casting means.

3. Apparatus as set forth in claim 2 wherein said melting means is an RF heater.

4. Apparatus as set forth in claim 1 wherein said moving means includes means for disposing said casting means with the metal in its solid state therein in juxtaposition with said melting means.

5. Apparatus as set forth in claim 4 wherein said moving means further includes means operable generally for removing said casting means from said melting means subsequent to the melting of the metal in said casting means, and said moving means thereafter effecting the movement of said casting means to its casting position.

6. Apparatus as set forth in claim 1 wherein said casting means is predeterminately tilted generally from the horizontal to prevent loss of the metal therefrom.

7. Apparatus as set forth in claim 1 further comprising means for actuating said casting means in its casting position to pour the molten metal therefrom.

8. Apparatus as set forth in claim 7 further comprising means for positioning said casting means to empty therefrom any residue of the metal subsequent to the actuation of said casting means by said actuating means to pour the molten metal.

9. Apparatus as set forth in claim 8 wherein said positioning means is operable generally to invert said casting means.

10. Apparatus as set forth in claim 8 wherein said positioning means includes means operable generally for rotating said casting means toward a position to effect the emptying therefrom of the metal residue.

11. Apparatus as set forth in claim 1 further comprising means for tipping said casting means generally about an axis thereof to effect displacement of the molten metal from said casting means when it is in its casting position.

12. Apparatus as set forth in claim 1 wherein said receiving means comprises a tube into which the metal is inserted.

13. Apparatus as set forth in claim 12 wherein said passage means comprises a slot in said tube.

14. Apparatus as set forth in claim 12 wherein said depositing means includes another tube movably mounted to said first named tube for at least partially closing said passage means.

15. Apparatus as set forth in claim 14 wherein said other tube includes other passage means for registry with said first named passage means to open it for the passage therethrough of the metal.

16. Apparatus as set forth in claim 15 further comprising means for rotating said other tube to register said other passage means with said first named passage means.

17. Apparatus as set forth in claim 1, wherein the moving means is also operable generally to return the casting means from its casting position toward a metal receiving position adjacent the receiving means, and wherein the moving means include means for actuating the depositing means when the casting means is returned to its metal receiving position.

18. Apparatus as set forth in claim 1 further comprising means for selectively operating said depositing means so as to effect the transfer of the metal through said passage means from said receiving means to said casting means when it is in a position to receive the metal.

19. Apparatus for casting a metal comprising a housing, a pair of movable means adapted to be relatively and conjointly movable in the housing, means for casting the metal adapted to be received in its solid stage therein, means for linking the casting means with one of said movable means, means for melting the metal, said movable means being operable generally to initially move said casting means toward a position juxtaposed with said melting means to melt the metal in said casting means and thereafter to further move said casting means toward a position for casting the molten metal, and said linking means including means for tilting said casting means to pour the molten metal therefrom when said casting means is in its casting position.

20. Apparatus as set forth in claim 19 wherein the other of said movable means comprises means for generally vertical movement in said housing.

21. Apparatus as set forth in claim 20 further comprising means for reciprocally moving said other movable means.

22. Apparatus as set forth in claim 19 wherein said one movable means comprises means mounted to the other of said movable means for generally lateral movement with respect thereto.

23. Apparatus as set forth in claim 22 further comprising means for reciprocally moving said one movable means.

24. Apparatus as set forth in claim 23 wherein said melting means is an RF heater.

25. Apparatus as set forth in claim 19 further comprising means for supplying metal to said casting means.

26. Apparatus as set forth in claim 19 wherein the metal received in said casting means is a measured amount.

27. Apparatus as set forth in claim 19 wherein said tilting means comprises means driven by said linking means for tipping said casting means about an axis thereof to effect the pouring of the molten metal therefrom.

28. Apparatus as set forth in claim 19 wherein said tilting means comprises a pair of sprockets, and a chain drive for said sprockets, one of said sprockets being driven by said linking means and said casting means being driven by the other of said sprockets, and means for driving said linking means.

29. Apparatus as set forth in claim 19 further comprising means for receiving a predetermined amount of the metal in its solid state, and means operable generally for depositing the metal into said casting means from said receiving means.

30. Apparatus for casting a metal comprising means for casting the metal melted therein, means for receiving a predetermined amount of the metal in its solid state, means for depositing the metal from said receiving means into said casting means, means for moving said casting means to a metal casting position when the metal therein is melted, means for actuating said casting means in its casting position to pour the molten metal therefrom, and means for positioning said casting means to empty therefrom any residue of the metal subsequent to the actuation of said casting means by said actuating means.

31. Apparatus as set forth in claim 30 wherein said positioning means is operable generally to invert said casting means.

32. Apparatus as set forth in claim 30 wherein said positioning means is operable generally to rotate said casting means to an inverted position.

33. Apparatus for casting a metal comprising means for casting the metal melted therein, means for receiving a predetermined amount of the metal in its solid state and generally constituted by a tube into which the metal is inserted, a slot in said tube for the passage therethrough of the metal into said casting means, means operable generally for depositing the metal into said casting means through said slot from said tube, and means for moving said casting means to a metal casting position when the metal therein is melted.

34. Apparatus as set forth in claim 33 wherein said depositing means includes another tube generally concentric with said first named tube for closing said slot.

35. Apparatus as set forth in claim 34 wherein said other tube includes another slot for registry with said first named slot to open it for the passage therethrough of the metal into said casting means.

36. Apparatus as set forth in claim 35 wherein the depositing means includes means for rotating said other tube to register said other slot with said first named slot.

37. Apparatus for casting a metal comprising means for casting the metal melted therein, means for receiving a predetermined amount of the metal in its solid state therein, means in said receiving means for the passage therethrough of the metal into said casting means, means for displacement relative to said receiving means to open said passage means, and means for moving said casting means to a metal casting position when the metal therein is melted.

38. Apparatus for casting a metal comprising means for casting the metal therein, means for receiving a predetermined amount of the metal in its solid state including means for depositing the entire amount of the metal into said casting means, and means for moving said casting means to a metal casting position when the metal therein is melted and for returning said casting means from its metal casting position toward a metal receiving position adjacent said receiving means, said moving and returning means including means for actuating said depositing means when said casting means is returned to its metal receiving position.

* * * * *

UNITED STATES PATENT OFFICE
CERTIFICATE OF CORRECTION

PATENT NO. : 3,979,032
DATED : September 7, 1976
INVENTOR(S) : Jesse A. Stoner

It is certified that error appears in the above–identified patent and that said Letters Patent are hereby corrected as shown below:

```
Col. 1, line 27, delete "necessry" and insert --necessary--.
Col. 2, line 15, delete "ladel" and insert --ladle--.
Col. 3, line 28, delete "refernce" and insert --reference--;
        line 42, delete "stage" and insert --state--.
Col. 4, line 11, delete "or" (second occurrence) and insert --of--;
        line 13, after "means" insert --,--.
Col. 6, line  6, delete "amount" and insert --mount--.
Col. 7, line 43, delete "stage" and insert --state--.
```

Signed and Sealed this

Fourteenth Day of December 1976

[SEAL]

Attest:

RUTH C. MASON
Attesting Officer

C. MARSHALL DANN
Commissioner of Patents and Trademarks